United States Patent
Cooke

(10) Patent No.: US 7,818,686 B2
(45) Date of Patent: Oct. 19, 2010

(54) SYSTEM AND METHOD FOR ACCELERATED WEB PAGE NAVIGATION USING KEYBOARD ACCELERATORS IN A DATA PROCESSING SYSTEM

(75) Inventor: Alan Cooke, Killiney (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/204,137

(22) Filed: Sep. 4, 2008

(65) Prior Publication Data

US 2010/0058239 A1 Mar. 4, 2010

(51) Int. Cl.
*G06F 3/048* (2006.01)

(52) U.S. Cl. .................. 715/827; 715/760; 715/764; 709/219

(58) Field of Classification Search .......... 715/760, 715/764, 827; 707/3, 10; 709/219
See application file for complete search history.

(56) References Cited

U.S. PATENT DOCUMENTS

| 5,963,950 | A * | 10/1999 | Nielsen et al. | 707/102 |
|---|---|---|---|---|
| 6,615,299 | B1 * | 9/2003 | Chu et al. | 710/65 |
| 6,724,399 | B1 * | 4/2004 | Katchour et al. | 715/740 |
| 6,920,609 | B1 | 7/2005 | Manber et al. | |
| 6,968,537 | B2 * | 11/2005 | Abdelhadi et al. | 717/106 |
| 7,272,853 | B2 | 9/2007 | Goodman et al. | |
| 7,552,400 | B1 * | 6/2009 | Sriver et al. | 715/827 |
| 2002/0023271 | A1 * | 2/2002 | Augenbraun et al. | 725/109 |
| 2002/0154159 | A1 * | 10/2002 | Day et al. | 345/738 |
| 2003/0004638 | A1 * | 1/2003 | Villers et al. | 701/211 |
| 2003/0201971 | A1 * | 10/2003 | Iesaka | 345/156 |
| 2004/0075696 | A1 * | 4/2004 | Koch et al. | 345/827 |
| 2004/0080544 | A1 * | 4/2004 | Stripling | 345/816 |
| 2004/0104944 | A1 * | 6/2004 | Koay et al. | 345/827 |
| 2004/0141012 | A1 | 7/2004 | Tootill | |
| 2004/0199932 | A1 * | 10/2004 | Gottfurcht et al. | 725/52 |
| 2004/0233052 | A1 * | 11/2004 | Uchigaki et al. | 340/525 |
| 2005/0268214 | A1 * | 12/2005 | Lu | 715/501.1 |

(Continued)

OTHER PUBLICATIONS

Blachman et al. "Google Guide", published web pages, Feb. 2, 2007, pp. 1-36.*

(Continued)

*Primary Examiner*—Ba Huynh
*Assistant Examiner*—Tuyetlien T Tran
(74) *Attorney, Agent, or Firm*—Dillon & Yudell LLP

(57) ABSTRACT

A system and method for accelerated web page navigation using keyboard accelerators in a data processing system. A navigation layer is provided within a web browser application to enable pre-processing of a markup language within a web page retrieved from a web server. Multiple sequentially and/or individually accessible pages (i.e., paged content) of the web page are detected and functionality of one or more buttons of a keyboard is associated with one or more navigation functions of the web page (i.e., keyboard accelerators are enabled). The keyboard accelerators include a right directional arrow button of the keyboard associated with a transition within the web page from a first page of the multiple individually accessible pages to a next sequential page, a left directional arrow button of the keyboard associated with a transition within the web page from a first page of the multiple individually accessible pages to a previous sequential page, and a numeric button of the keyboard associated with a corresponding page number of individual pages of the web page.

8 Claims, 4 Drawing Sheets

U.S. PATENT DOCUMENTS

| | | | | |
|---|---|---|---|---|
| 2006/0164396 | A1* | 7/2006 | Anderson | 345/172 |
| 2006/0168547 | A1* | 7/2006 | Boyles et al. | 715/854 |
| 2007/0061486 | A1* | 3/2007 | Trinh et al. | 709/246 |
| 2007/0180407 | A1* | 8/2007 | Vahtola | 715/847 |
| 2008/0235789 | A1* | 9/2008 | Erwin et al. | 726/19 |
| 2009/0064010 | A1* | 3/2009 | Sojan et al. | 715/764 |
| 2009/0089415 | A1* | 4/2009 | Lecomte et al. | 709/224 |
| 2009/0089416 | A1* | 4/2009 | Chi | 709/224 |

OTHER PUBLICATIONS

Firefox Facts; "Mouseless Browsing With Firefox"; http://www.firefoxfacts.com/2008/01/29/mouseless-browsing-with-firefox/; Jan. 29, 2008; PGS.

* cited by examiner

SYSTEM AND METHOD FOR ACCELERATED WEB PAGE NAVIGATION USING KEYBOARD ACCELERATORS IN A DATA PROCESSING SYSTEM

BACKGROUND

1. Technical Field

The present invention relates generally to data processing systems and in particular to methods for accelerated web page navigation using keyboard accelerators within data processing systems.

2. Description of the Related Art

Web sites often contain information that spans more than one page. For example, when a search engine (e.g., Google®, a registered trademark of Google, Inc.) is used to perform a search, the search result is generally separated and split across multiple pages. Thus, quick navigation across these multiple web pages is quite difficult. To navigate, a user will typically have to use a mouse to click directly on a desired link to navigate across web pages. Alternatively a user may use the "Forward" and "Back" buttons for web page navigation that are often provided by web browsers. However, the "Forward" and "Back" buttons typically only provide navigation to previously visited web pages. Keyboard navigation is also available within web browsers based on the tab index of a web page (e.g., a user can successively press the "tab" button on a keyboard to move around the web page to a particular link that the user would like to access). However, keyboard navigation using the tab index of a web page can be very non-deterministic in its behavior and can often be counter-productive. Whether using a mouse or a keyboard, these navigation techniques require considerable input from the user.

SUMMARY OF ILLUSTRATIVE EMBODIMENTS

Disclosed are a system and method for accelerated web page navigation using keyboard accelerators in a data processing system. A navigation layer is provided within a web browser application to enable pre-processing of a markup language within a web page retrieved from a web server. The web page is retrieved from the web server. Paged content of the web page is detected at the navigation layer. In response to the web page having multiple sequentially and/or individually accessible pages, functionality of one or more buttons of a keyboard is associated with one or more navigation functions of the web page. The associating includes assigning a first functionality of a right directional arrow button of the keyboard with a transition within the web page from a first page of the multiple individually accessible pages to a next sequential page, identified by the markup language within the web page, when a current view of the web page is not a last page of the multiple pages. The associating further includes assigning a second functionality of a left directional arrow button of the keyboard with a transition within the web page from a first page of the multiple individually accessible pages to a previous sequential page, identified by the markup language within the web page, when a current view of the web page is not a first page of the multiple pages. In response to the multiple sequentially and/or individually accessible pages having page numbers associated therewith, specific functionality of a numeric button of the keyboard is assigned to a corresponding page number of individual pages of the web page. Selection of a particular numeric button triggers a transition within the web page to a corresponding page having the same page number as a number associated with the particular numeric button.

The above, as well as additional objectives, features, and advantages of the present invention, will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
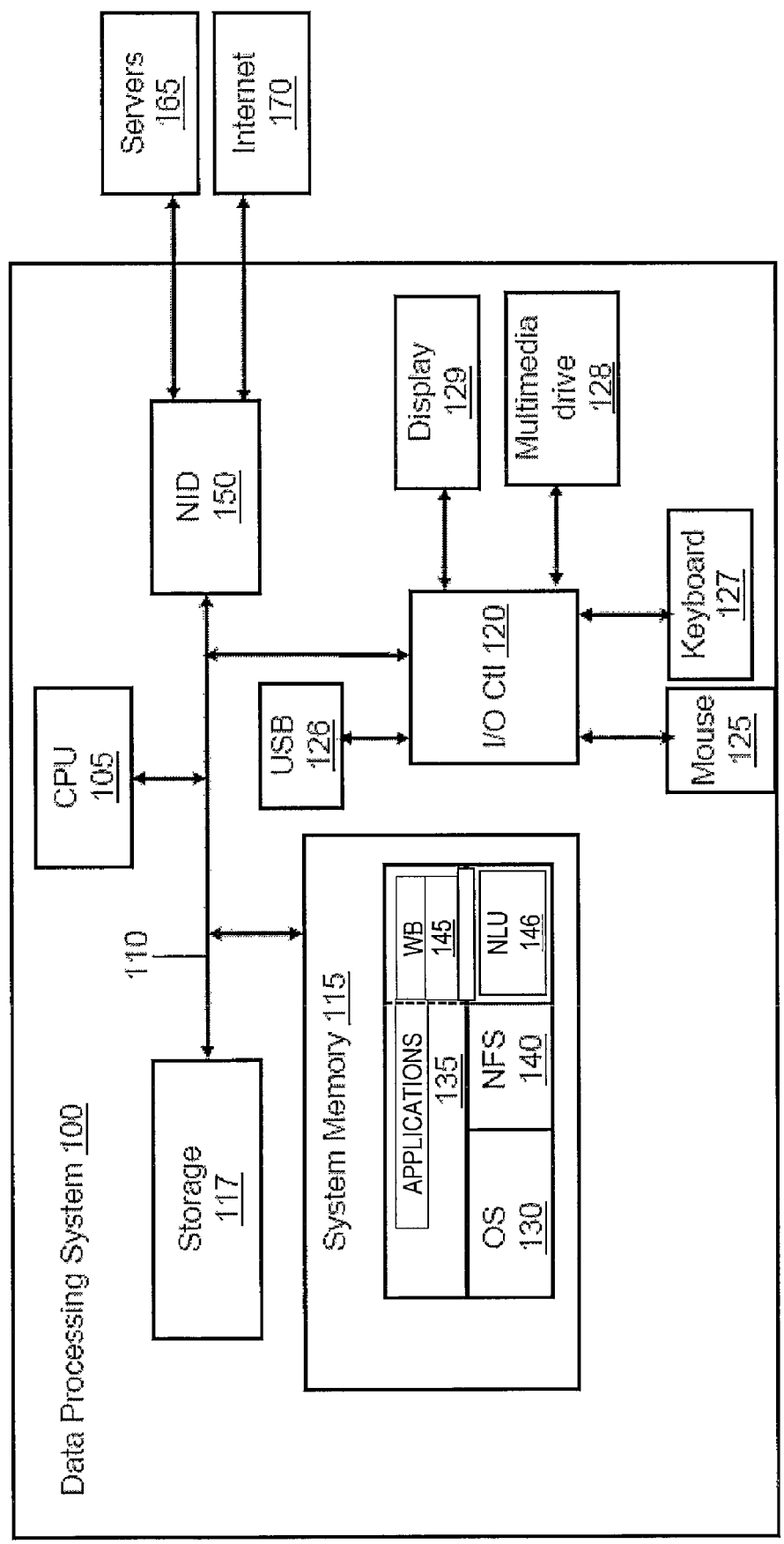
FIG. 1 is a block diagram of a data processing system configured with hardware and software components for implementing one or more embodiments of the present invention.

The illustrative embodiments depict systems and methods for accelerated web page navigation using keyboard accelerators in a data processing system. A navigation layer is provided within a web browser application to enable pre-processing of a markup language within a web page retrieved from a web server. Multiple sequentially and/or individually accessible pages (i.e., paged content) of the web page are detected and functionality of one or more buttons of a keyboard is associated with one or more navigation functions of the web page (i.e., keyboard accelerators are enabled). The keyboard accelerators include a right directional arrow button of the keyboard associated with a transition within the web page from a first page of the multiple individually accessible pages to a next sequential page, a left directional arrow button of the keyboard associated with a transition within the web page from a first page of the multiple individually accessible pages to a previous sequential page, and a numeric button of the keyboard associated with a corresponding page number of individual pages of the web page.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the terms "comprise", "comprises", and "comprising" are used in an open-ended fashion, and thus should be interpreted to mean "including, but not limited to . . . ". Also, the term "coupled" is intended to mean either an indirect or direct connection. Thus, if a first device is coupled to a second device, that connection may be through a direct connection, through an indirect connection via other devices and connections, or through a wireless connection.

With reference now to the figures, FIG. 1 illustrates a block diagram representation of a data processing system (and connected network). Data processing system (DPS) 100 comprises at least one processor or central processing unit (CPU) 105 connected to system memory 115 via system interconnect/bus 110. System memory 115 is defined as a lowest level of volatile memory (not shown), including, but not limited to, cache memory, registers, and buffers. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) hub 126 are illustrated, coupled to I/O controller 120. Multimedia drive 128 and USB hub 126 may operate as both input and output (storage) mechanisms. DPS 100 also comprises storage 117, within which data/instructions/code may be stored.

DPS 100 is also illustrated with network interface device (NID) 150 coupled to system bus 110. NID 150 enables DPS 100 to connect to one or more access networks, such as servers 165 and Internet 170.

In the described embodiments, Internet 170 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet 170, for example. Those of ordinary skill in the art will appreciate that the hardware depicted in FIG. 1 is a basic illustration of an ISP server, and thus the hardware utilized in actual implementation may vary. Thus, the depicted example is not meant to imply architectural limitations with respect to the present invention.

Notably, in addition to the above described hardware components of DPS 100, various features of the invention are completed via software (or firmware) code or logic stored within memory 115 or other storage (e.g., storage 117) and executed by CPU 105. In one embodiment, data/instructions/code from storage 117 populates the system memory 115, which is also coupled to system bus 110. Thus, illustrated within memory 115 are a number of software/firmware components, including operating system (OS) 130 (e.g., Microsoft Windows®, a registered trademark of Microsoft Corporation; GNU®, a registered trademark of the Free Software Foundation; Linux®, a registered trademark of Linus Torvalds; AIX®, a registered trademark of International Business Machines (IBM); or Mac OS®, a registered trademark of Apple Computer, Inc.), applications 135, network file system (NFS) 140, and web browser (WB) 145 (e.g., Internet Explorer®, a registered trademark of Microsoft Corporation; Netscape Navigator®, a registered trademark of Netscape Communications Corporation; Firefox®, a registered trademark of Mozilla Foundation; Opera®, a registered trademark of Opera Software ASA; or Safari®, a registered trademark of Apple Computer, Inc.) that comprises a navigation layer utility (NLU) 146.

In actual implementation, applications 135, WB 145, and NLU 146 may be combined as a single application collectively providing the various functions of each individual software component when the corresponding code is executed by the CPU 105. Additionally, components or code of OS 130 may be combined with those of NLU 146, collectively providing the various functional features of the present invention when the corresponding code is executed by the CPU 105. For simplicity, NLU 146 is illustrated and described as a stand alone or separate software/firmware component, which is stored in system memory 115 to provide/support the specific novel functions described herein.

In one illustrative embodiment CPU 105 executes software code/instructions of NLU 146. Among the software code/instructions provided by NLU 146, and which are specific to the present invention, are: (a) code for providing a navigation layer within a web browser application to enable pre-processing of markup language (e.g., HyperText Markup Language (HTML), Extensible HTML (XHTML), or Extensible Markup Language (XML)) within a web page received from a web server; (b) code for detecting paged content of the web page at the navigation layer; and (c) code for associating functionality of one or more buttons of the keyboard with one or more navigation functions of the web page. For simplicity of the description, the collective body of code that enables these various features is referred to herein as NLU 146. According to one illustrative embodiment, when CPU 105 executes NLU 146, DPS 100 initiates a series of functional processes that enable the above functional features as well as additional features/functionality, which are described below within the description of FIGS. 2-4.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
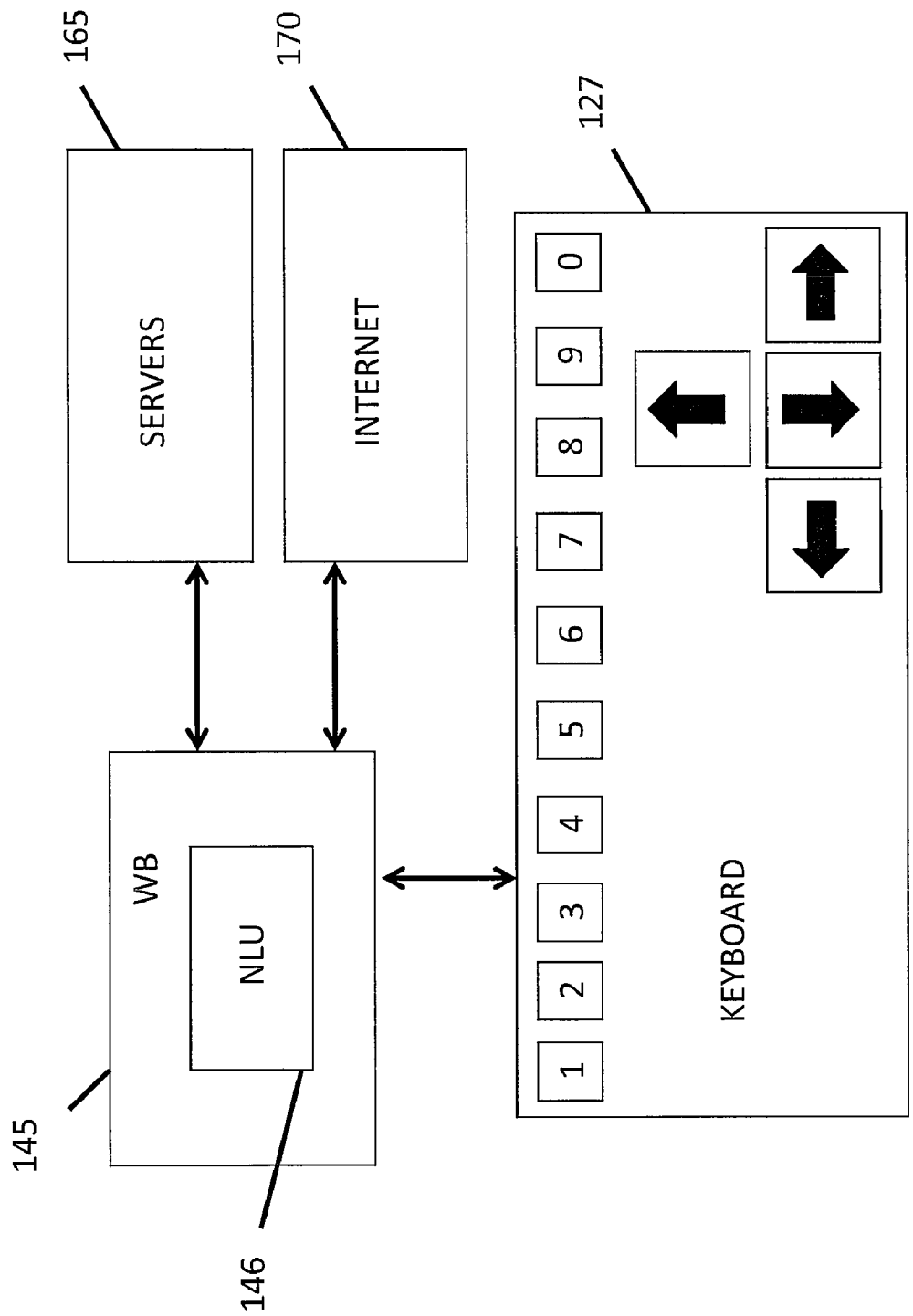
FIG. 2 is a block diagram illustrating a web browser and a keyboard for implementing one or more embodiments of the present invention.

FIG. 2 illustrates a block diagram of exemplary web browser (WB) 145, which comprises navigation layer utility (NLU) 146. NLU 146 provides a navigation layer within the web browser 145 application that enables pre-processing of markups (i.e., markup language) within a web page received from a web server. The web server may include servers 165 (e.g., local or remote servers) or the internet 170. In some embodiments, NLU 146 is implemented as a plug-in for web browser 145 that has an extensible architecture (e.g., Firefox®). In other embodiments, NLU 146 is implemented as part of a stand-alone web browser. Pre-processing of the markups within the web page by NLU 146 includes detecting, at the navigation layer, paged content of the web page. For purposes of this disclosure, "paged content" can be defined as a web page having multiple sequentially and/or individually accessible pages. As an example of "paged content", results of a search request performed using a search engine (e.g., Google®, a registered trademark of Google Inc.) are generally separated and split across multiple pages, which are sequentially and/or individually accessible. However, the present invention is not limited to search engine results, but rather the present invention can be applied to any web page having paged content. Moreover, a "web page", as used throughout the description and the claims, can be generally defined as any file, document, or markup language, with or without paged content, that can be retrieved from the web server (e.g., the servers 165 or the internet 170).

Still referring to FIG. 2, when NLU 146 detects paged content of the web page, NLU 146 associates functionality of one or more buttons of the keyboard 127 (or other input devices) with one or more navigation functions of the web page. For purposes of this disclosure, the one or more buttons of the keyboard 127, when associated with one or more navigation functions of the web page, may be referred to as "keyboard accelerators" or "keyboard listeners". Thus, if NLU 146 detects paged content on the web page, a keyboard accelerator is enabled. In embodiments where a keyboard accelerator was previously enabled and where NLU 146 subsequently detects that there is no paged content on a particular web page, then NLU 146 may disable the previously enabled keyboard accelerator. As shown, keyboard 127 comprises a plurality of buttons, only some of which are depicted in FIG. 2. In particular, keyboard 127 comprises numeric buttons 0-9 as well as a left directional arrow, right directional arrow, down directional arrow, and up directional arrow.

In some embodiments, NLU 146 associates with the right directional arrow of the keyboard 127, a functionality comprising a transition within the web page from a first page of the multiple individually accessible pages to a next sequential page, identified by markup within the web page, when a current view of the web page is not a last page of the multiple individually accessible pages. In other embodiments, NLU 146 associates with the left directional arrow of the keyboard 127, a functionality comprising a transition within the web page from a first page of the multiple individually accessible pages to a previous sequential page, identified by markup within the web page, when a current view of the web page is not a first page of the multiple individually accessible pages. In yet other embodiments, each of the multiple individually accessible pages has an associated page number, and NLU 146 associates functionality of a numeric button of the keyboard 127 with a corresponding page number of one of the multiple individually accessible pages. A selection of a particular numeric button of the keyboard 127 thus triggers a transition within the web page to a corresponding one of the multiple individually accessible pages that has the same page number as a number associated with the particular numeric button of the keyboard 127. In some embodiments where at least one of the multiple individually accessible pages has an associated page number comprising two or more digits, the NLU 146 associates functionality of a sequence of two or more numeric buttons of the keyboard 127 with the corresponding page number of one of the multiple individually accessible pages. Thus, a selection of the sequence of two or more numeric buttons of the keyboard 127 will trigger a transition within the web page to the corresponding one of the multiple individually accessible pages that has the same page number as the number associated with the particular sequence of two or more numeric buttons of the keyboard 127. In some embodiments, the up directional arrow, the down directional arrow, or other buttons of the keyboard 127, which are not shown in FIG. 2 (e.g., alphabetic buttons A-Z or function keys F1-F12), are associated to a specific navigation function of the web page by way of NLU 146.

Figure 3:
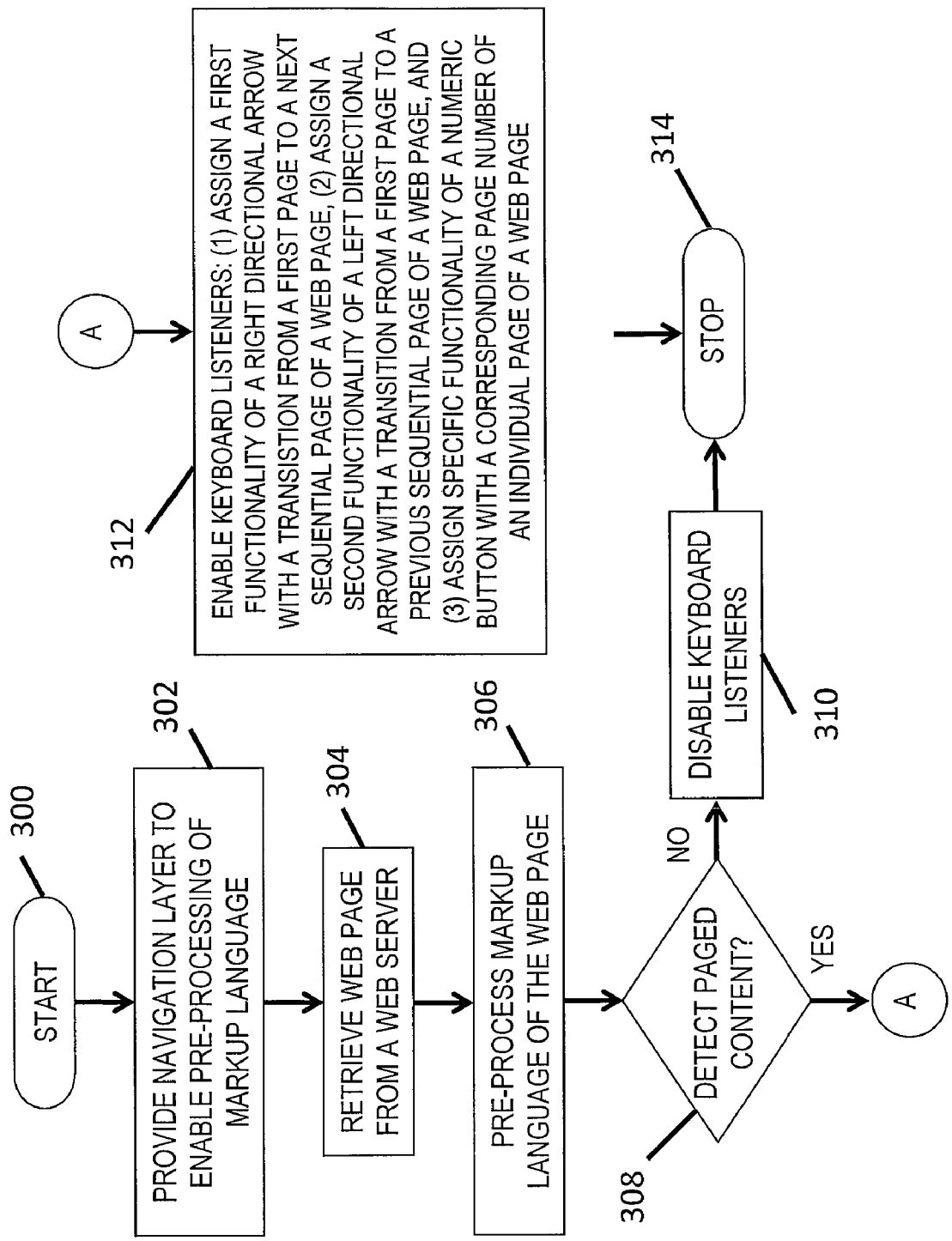
FIG. 3 is a high-level logical flowchart illustrating an exemplary method for accelerated web page navigation in accordance with one or more embodiments of the present invention.
Figure 4:
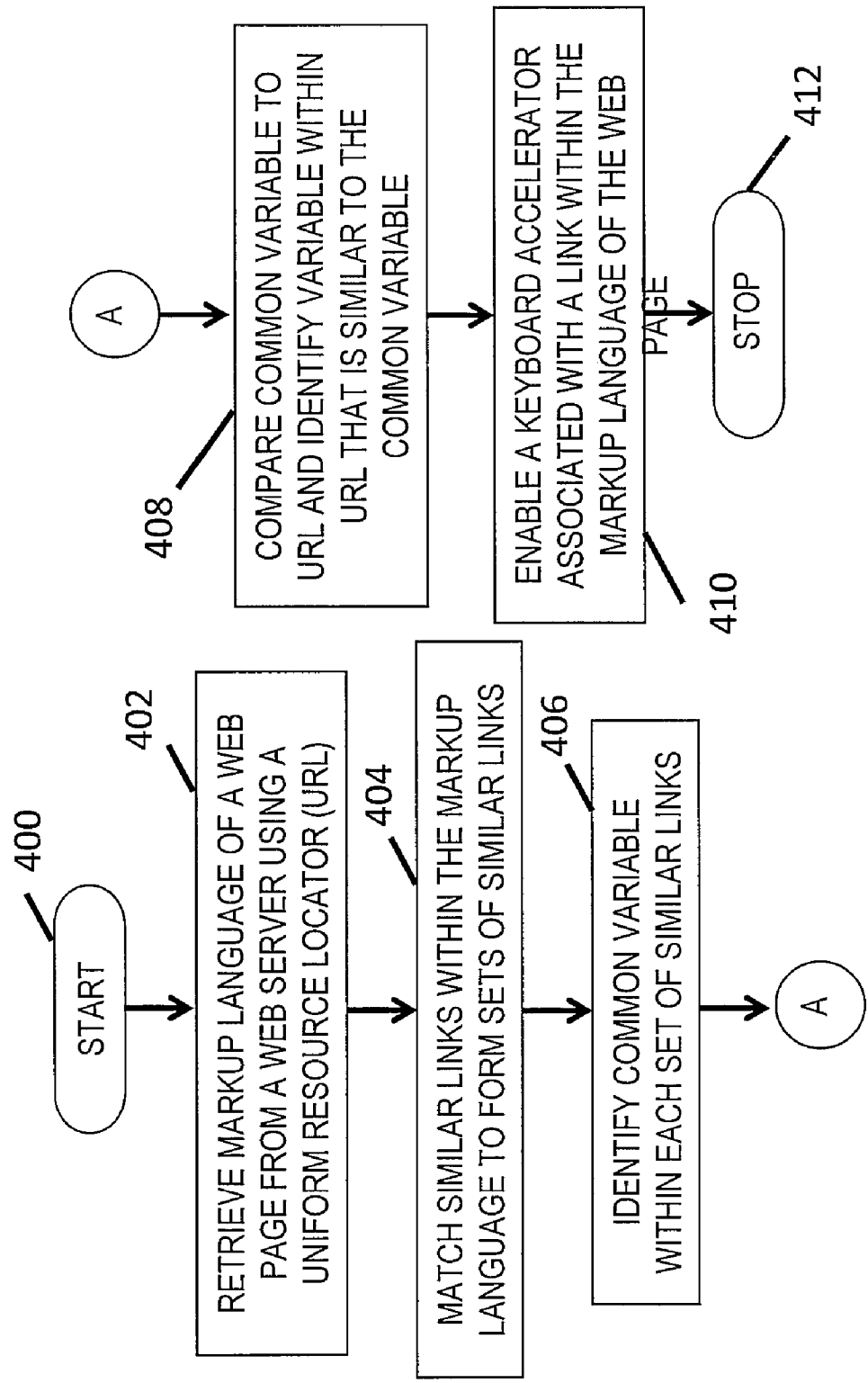
FIG. 4 is a high-level logical flowchart illustrating an exemplary method for detecting if a web page contains paged content in accordance with one or more embodiments of the present invention.

FIG. 3 is a high-level logical flow chart illustrating an exemplary method by which the above processes of the illustrative embodiments are completed. FIG. 4 is a high-level logical flow chart illustrating an exemplary method used to detect if a web page contains paged content in accordance with one or more embodiments of the present invention. Although the methods illustrated in FIGS. 3 and 4 may be described with reference to components shown in FIGS. 1 and 2, it should be understood that this is merely for convenience and alternative components and/or configurations thereof can be employed when implementing the various methods. Key portions of the methods may be completed by NLU 146 executing within DPS 100 (FIG. 1) and controlling specific operations of/on DPS 100, and the methods are thus described from the perspective of either/both NLU 146 and DPS 100.

The process of FIG. 3 begins at block 300 and proceeds to block 302, which illustrates providing a navigation layer (e.g., provided by the navigation layer utility (NLU) 146 as shown in FIGS. 1 and 2) to enable pre-processing of markup language within a web page that is retrieved from a web server. The web page is then retrieved from the web server as shown in block 304. The pre-processing of the markup language of the web page begins at block 306. As part of the pre-processing, the NLU 146 detects if the web page has paged content as shown in block 308. The detecting is performed at the navigation layer, where the navigation layer was previously provided at block 302. If the web page is determined to have paged content, then the process proceeds to block 312 where keyboard listeners, or keyboard accelerators, are enabled. In particular, NLU 146 assigns a first functionality of a right directional arrow of the keyboard 127 with a transition within the web page from a first page of the multiple individually accessible pages to a next sequential page, identified by markup within the web page, when a current view of the web page is not a last page of the multiple pages. NLU 146 also associates a second functionality of a left directional arrow of the keyboard 127 with a transition within the web page from a first page of the multiple individually accessible pages to a previous sequential page, identified by markup within the web page, when a current view of the web page is not a first page of the multiple pages. In addition, NLU 146 associates functionality of a numeric button of the keyboard 127 with a corresponding page number of one of the multiple individually accessible pages. A selection of a particular numeric button of the keyboard 127 thus triggers a transition within the web page to a corresponding one of the multiple individually accessible pages that has the same page number as a number associated with the particular numeric button of the keyboard 127. In some embodiments, other types of key assignments may have been pre-assigned before the end of the process. The process then ends at block 314. Returning to block 308, if the web page is determined to not have paged content, then the process proceeds to block 310 where any previously enabled keyboard listeners, or keyboard accelerators, are disabled. The process then ends at block 314.

The process of FIG. 4 illustrates an exemplary method used to detect if a web page contains paged content (i.e., a detection algorithm) in accordance with one or more embodiments of the present invention. The detection algorithm generally functions by passing a variable through a Uniform Resource Locator (URL) of the current location, where a URL is a pointer to a resource (e.g., a web page) on the web server. The detection algorithm uses a heuristic approach to detection and matches links based on similarity. The similarity of the links is measured and refined to a point where a common variable is identified. For purposes of this disclosure, similar links can be defined as a plurality of links (e.g., within the markup language of the web page), each having an associated URL comprising a common portion and a variable, where the common portion of the URL for each of the plurality of links is the same and the variable is different for each of the URLs. In some embodiments, the variable comprises a number, a letter, symbol, or some combination thereof. The process begins at block 400 and then proceeds to block 402, where markup language of a web page is retrieved from a web server (e.g., servers 165 or internet 170 as shown in FIGS. 1 and 2) using the URL. In block 404, similar links within the markup language of the web page are matched to form sets of similar links. The process then proceeds to block 406 where a common variable is identified within each set of similar links. Once the common variable is identified, the common variable is compared to the URL, in block 408, to identify a variable within the URL that is similar to the common variable previously identified in block 406. After the similar variable within the URL is identified, in block 410, a keyboard listener (or keyboard accelerator) associated with an appropriate link within the markup language of the web page is enabled (e.g., associating the right directional arrow with a transition within the web page from a first page of the multiple individually accessible pages to a next sequential page, as shown in FIG. 3). The process then ends at block 412.

The detection algorithm, as illustrated in FIG. 4, may also provide a feedback or a learning feature whereby the detection algorithm can adapt and learn from new patterns (e.g., patterns learned from user input), and the learned patterns could be stored in a centralized repository (e.g., a central server or database) and thus be accessible to other users.

It should be understood that one or more aspects of the present invention may alternatively be implemented in a computer usable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore not to be taken in a limiting sense, and the scope of the present invention is defined only by the appended claims.

As will be further appreciated, the processes in embodiments of the present invention may be implemented using software, firmware, hardware, or any combination thereof or their equivalent. As a preparatory step to practicing the invention in software, the programming code (whether software or firmware) may be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. In some embodiments, transmission type media may include computer networks and telephone networks, including Ethernet, the Internet, wireless networks, and like networks. It should be understood, therefore, that such signal-bearing media, when carrying or encoding computer-readable instructions that direct method functions in the present invention, represent alternative embodiments of the present invention. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system having an input mechanism, including a keyboard, a method comprising:

providing a navigation layer within a web browser application to enable pre-processing of a markup language within a single web results page that is retrieved from a web server and contains paged content comprised of multiple individually accessible windows or pages corresponding to the single web results page;

retrieving the content of the single web results page from the web server, wherein the single web results page includes a single content that is retrieved from a single, content-providing web site and is distributed among multiple pares, each pare containing different portions of the single content, and wherein the content is not a multi-page listing of search results returned as hits to a web search operation;

detecting, at the navigation layer, when there is paged content of the single web results page, wherein the paged content includes multiple individually accessible windows or pages of the single web results page, wherein the individually accessible windows or pages are accessed by a selectable backwards and forwards navigation function visible on the web results page;

in response to detecting that there is no paged content of the web page, disabling a keyboard accelerator, wherein the keyboard accelerator provides an associated functionality between one or more buttons of the keyboard and one or more navigation functions of the web page; and in response to the single web results page having retrieved content that is presented as paged content, with multiple individually accessible windows or pages containing different portions of the retrieved content for the single web results page, associating functionality of one or more buttons of the keyboard with one or more navigation functions of the single web results page, wherein said associating includes:
- assigning a first functionality of a right directional arrow button of the keyboard with a transition within the single web results page from a first page of the multiple sequential and individually accessible pages to a next sequential page, identified by the markup language within the single web results page, when a current view of the single web results page is not a last page of the multiple sequential and individually accessible pages;
- assigning a second functionality of a left directional arrow button of the keyboard with a transition within the single web results page from a first page of the multiple sequential and individually accessible pages to a previous sequential page, identified by the markup language within the single web results page, when a current view of the single web results page is not a first page of the multiple pages; and
- in response to the multiple individually accessible pages having page numbers associated therewith, assigning specific functionality of a numeric button of the keyboard to a corresponding page number of individual pages of the single web results page, wherein selection of a particular numeric button triggers a transition within the single web results page to a corresponding page having a same page number as a number associated with the particular numeric button;

wherein retrieving the single web results page from the server further comprises retrieving the markup language within the single web results page from the web server by a uniform resource locator (URL);

wherein detecting the paged content of the single web results page further comprises matching similar links within the markup language to form sets of similar links; and in response to said matching similar links, identifying a common variable within each set of similar links;

in response to said identifying the common variable, comparing the common variable to the URL, wherein said comparing further comprises identifying a variable within the URL that is similar to the common variable; and in response to said identifying the variable within the URL, enabling a keyboard accelerator associated with a link within the markup language.

2. In a data processing system having an input mechanism, including a keyboard, a method comprising:
- providing a navigation layer within a web browser application to enable pre-processing of a markup language within a web page of content retrieved from a web server and which content is divided among multiple different pages to create paged content comprised of multiple individually accessible windows or pages each containing different portions of the same content corresponding to the web page;
- retrieving the content of the single web results page from the web server, wherein the web page includes a single content that is retrieved from a single, content-providing web site and is distributed among multiple pares, each pare containing different portions of the single content, and wherein the content is not a multi-page listing of search results returned as hits to a web search operation;
- detecting, at the navigation layer, retrieved paged content of the web page, wherein the retrieved paged content includes multiple individually accessible and viewable windows or pages of content corresponding to the web page, which pages of content are selectively accessible via one or more navigation functions displayed on the web page; and
- in response to the web page having multiple individually accessible and viewable pages of retrieved pared content, associating functionality of one or more buttons of the keyboard with one or more navigation functions of the web page to enable the one or more buttons of the keyboard to control the navigation functions and enable access to each of the multiple individually accessible and separately viewable pages of retrieved paged content, wherein a keyboard accelerator function is disabled when no paged content is detected within the web page; and
- retrieving the web page from the server further comprises retrieving the markup language within the web page from the web server by a uniform resource locator (URL);
- detecting paged content of the web page further comprises matching similar links within the markup language to form sets of similar links; and
- in response to said matching similar links, identifying a common variable within each set of similar links;
- in response to said identifying the common variable, comparing the common variable to the URL, wherein said comparing further comprises identifying a variable within the URL that is similar to the common variable; and
- in response to said identifying the variable within the URL, enabling a keyboard accelerator associated with a link within the markup language.

3. The method of claim 2, wherein said associating comprises:
- assigning a first functionality of a right directional arrow button of the keyboard with a transition within the web page from a first page of the multiple individually accessible pages to a next sequential page, identified by the markup language within the web page, when a current view of the web page is not a last page of the multiple pages; and
- assigning a second functionality of a left directional arrow button of the keyboard with a transition within the web page from a first page of the multiple individually accessible pages to a previous sequential page, identified by the markup language within the web page, when a current view of the web page is not a first page of the multiple pages.

4. The method of claim 2, wherein said associating further comprises:
- in response to the multiple individually accessible pages of content having page numbers associated therewith, assigning specific functionality of a numeric button of the keyboard to a corresponding page number of individual pages of the web page, wherein selection of a particular numeric button triggers a transition within the web page to a corresponding page having the same page number as a number associated with the particular numeric button.

5. A computer program product comprising:
a machine readable storage medium; and
program code stored on the computer storage medium that when executed by a processor of a device having an input mechanism performs the functions of:
- providing a navigation layer within a web browser application to enable pre-processing of a markup language within a web page of content retrieved from a web server and which content is divided among multiple different pages to create paged content comprised of multiple individually accessible windows or pages each containing different portions of the content corresponding to the web page;

retrieving the content of the single web results page from the web server, wherein the web page includes a single content that is retrieved from a single, content-providing web site and is distributed among multiple pares, each pare containing different portions of the single content, and wherein the content is not a multi-page listing of search results returned as hits to a web search operation;

detecting, at the navigation layer, retrieved paged content of the web page, wherein the retrieved paged content includes multiple individually accessible and viewable windows or pages of content corresponding to the web page, which pages of content are selectively accessible via one or more navigation functions displayed on the web page; and in response to the web page having multiple individually accessible and viewable pages of content, associating functionality of one or more buttons of the keyboard with one or more navigation functions of the web page to enable the one or more buttons of the keyboard to control the navigation functions and enable access to each of the multiple individually accessible and separately viewable pages of content, wherein a keyboard accelerator function is disabled when no pared content is detected within the web page; and retrieving the web page from the server further comprises retrieving the markup language within the web page from the web server by a uniform resource locator (URL);

detecting paged content of the web page further comprises matching similar links within the markup language to form sets of similar links;

in response to said matching similar links, identifying a common variable within each set of similar links;

in response to said identifying the common variable, comparing the common variable to the URL, wherein said comparing further comprises identifying a variable within the URL that is similar to the common variable; and in response to said identifying the variable within the URL, enabling a keyboard accelerator associated with a link within the markup language.

6. The computer program product of claim 5, wherein said program code for associating comprises code for:

assigning a first functionality of a right directional arrow button of the keyboard with a transition within the web page from a first page of the multiple individually accessible pages to a next sequential page, identified by the markup language within the web page, when a current view of the web page is not a last page of the multiple pages; and assigning a second functionality of a left directional arrow button of the keyboard with a transition within the web page from a first page of the multiple individually accessible pages to a previous sequential page, identified by the markup language within the web page, when a current view of the web page is not a first page of the multiple pages.

7. The computer program product of claim 5, wherein said program code for associating further comprises code for:

in response to the multiple individually accessible pages of content having page numbers associated therewith, assigning specific functionality of a numeric button of the keyboard to a corresponding page number of individual pages of the web page, wherein selection of a particular numeric button triggers a transition within the web page to a corresponding page having the same page number as a number associated with the particular numeric button.

8. The computer program product of claim 5, further comprising:

detecting, at the navigation layer, that there is no paged content of the web page; and in response to detecting no paged content of the web page, disabling a keyboard accelerator, wherein the keyboard accelerator provides an associated functionality between said one or more buttons of the keyboard and said one or more navigation functions of the web page.

* * * * *